United States Patent [19]

Ishiguro et al.

[11] Patent Number: 5,357,444
[45] Date of Patent: Oct. 18, 1994

[54] RETARDING CONTROL APPARATUS WHICH OPERATES ON THE BASIS OF SIGNALS SUCH AS A SHIFT LEVER POSITION SIGNAL

[75] Inventors: Toshiaki Ishiguro, Chita; Takayuki Ishihara, Toyokawa, both of Japan

[73] Assignee: Aisin Seiki Kabushiki Kaisha, Kariya, Japan

[21] Appl. No.: 183,790

[22] Filed: Jan. 21, 1994

Related U.S. Application Data

[63] Continuation of Ser. No. 660,558, Feb. 25, 1991, abandoned.

[30] Foreign Application Priority Data

Feb. 28, 1990 [JP] Japan .................................. 2-45664
Mar. 23, 1990 [JP] Japan .................................. 2-72000

[51] Int. Cl.⁵ ....................... F02D 45/00; B60K 41/06
[52] U.S. Cl. ............................ 364/426.01; 364/424.1; 364/431.07; 123/319; 477/92
[58] Field of Search ........... 364/424.1, 426.01, 426.04, 364/431.07, 431.09; 74/884, 887, 866, 867, 879; 123/319, 320–331

[56] References Cited

U.S. PATENT DOCUMENTS

| | | | |
|---|---|---|---|
| 3,805,640 | 4/1974 | Schneider et al. | 74/884 |
| 3,927,579 | 12/1975 | Golan | 74/868 X |
| 4,015,488 | 4/1977 | Akeson et al. | 74/866 |
| 4,223,649 | 9/1980 | Robinson et al. | 123/319 |
| 4,273,208 | 6/1981 | Liermann | 180/179 |
| 4,305,353 | 12/1981 | Robinson et al. | 123/333 |
| 4,338,832 | 7/1982 | Pelligrino | 74/866 |
| 4,355,605 | 10/1982 | Robinson et al. | 123/320 |
| 4,373,619 | 2/1983 | Schritt et al. | 74/866 X |
| 4,407,388 | 10/1983 | Steel | 180/271 |
| 4,462,277 | 7/1984 | Miki et al. | 74/867 |
| 4,476,746 | 10/1984 | Miki et al. | 74/867 |
| 4,546,840 | 10/1985 | Yukishige et al. | 180/169 |
| 4,621,705 | 11/1986 | Etoh | 180/169 |
| 4,628,317 | 12/1986 | Nishikawa et al. | 180/169 X |
| 4,669,435 | 6/1987 | Furusawa et al. | 123/323 |
| 4,703,429 | 10/1987 | Sakata | 180/169 X |
| 4,706,195 | 11/1987 | Yoshino et al. | 180/169 X |
| 4,722,410 | 2/1988 | Melocik et al. | 180/169 |
| 4,742,806 | 5/1988 | Tart, Jr. et al. | 123/322 |
| 4,753,134 | 6/1988 | Hayasaki | 74/866 |
| 4,787,044 | 11/1988 | Nagata et al. | 364/431.07 |
| 4,833,469 | 5/1989 | David | 180/169 X |
| 4,864,298 | 9/1989 | Dombrowski | 180/169 X |
| 4,881,173 | 11/1989 | Kato et al. | 364/431.07 |
| 5,014,200 | 5/1991 | Chundrlik et al. | 364/426.04 |
| 5,053,979 | 10/1991 | Etoh | 364/565 |
| 5,107,725 | 4/1992 | Takahashi | 74/867 |
| 5,124,923 | 6/1992 | Takahashi | 364/426.04 |

FOREIGN PATENT DOCUMENTS

| | | |
|---|---|---|
| 62-61843 | 3/1987 | Japan . |
| 63-291751 | 11/1988 | Japan . |
| 64-87951 | 4/1989 | Japan . |
| 64-87952 | 4/1989 | Japan . |
| 64-87953 | 4/1989 | Japan . |
| 64-87963 | 4/1989 | Japan . |

Primary Examiner—Thomas G. Black
Assistant Examiner—Collin W. Park
Attorney, Agent, or Firm—Burns, Doane, Swecker & Mathis

[57] ABSTRACT

A retarding control apparatus for controlling operation of a retarder, which is connected to an automatic transmission, by operating a retarder actuating device by manipulation of a retarder changeover switch includes control unit, to which are inputted a shift position signal, a throttle opening signal and a changeover signal from the retarder changeover switch, for outputtig an operating signal to the retarder actuating device. When the control unit receives the changeover signal from the retarder changeover switch for actuating the retarder and decides that a manual downshift has taken place based upon the shift position signal and throttle opening signal, the control unit diminishes the operating signal to the retarder actuating device in such a manner that braking force produced by the retarder is reduced by a prescribed value.

3 Claims, 7 Drawing Sheets

PRIOR ART    Fig.1
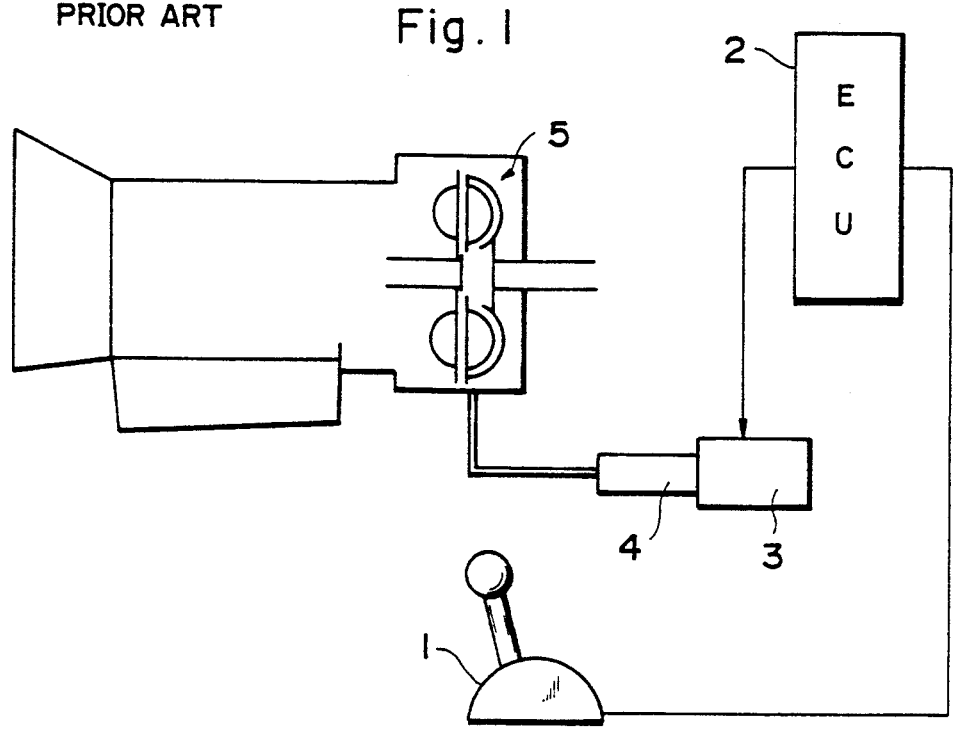
PRIOR ART    Fig.2
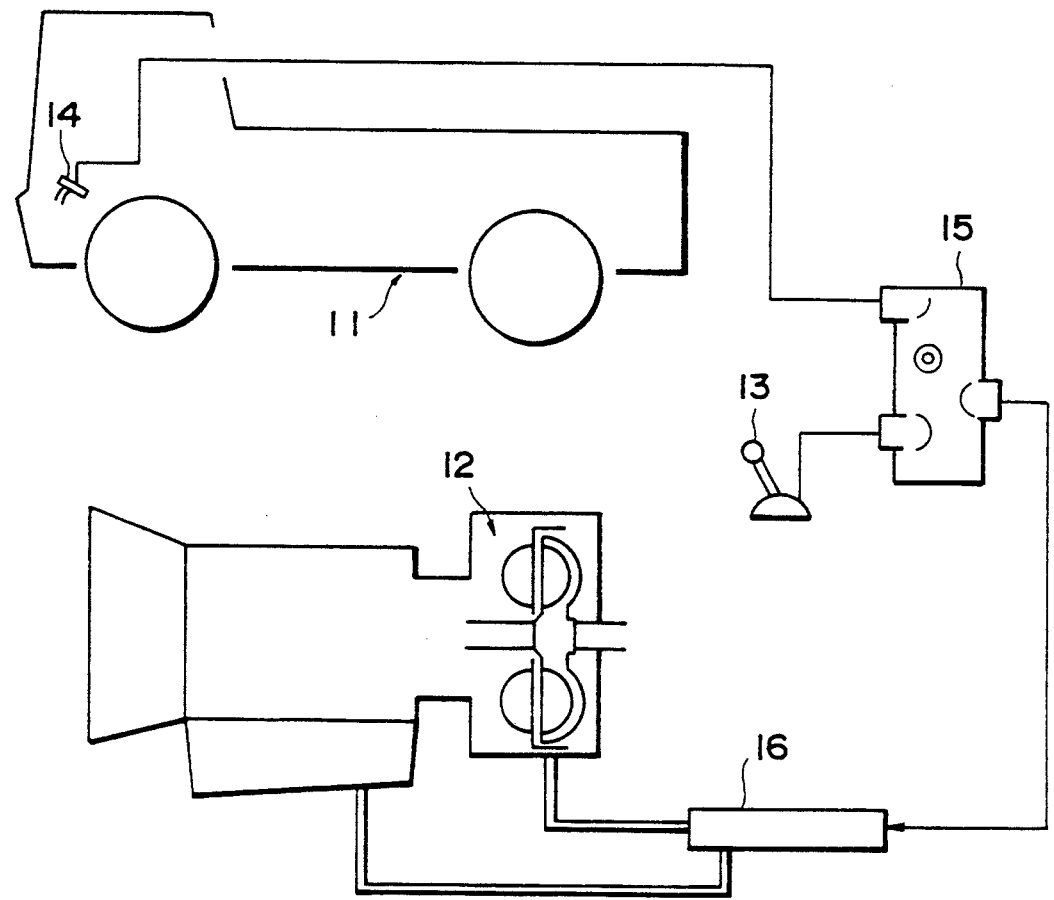

shift position (MAP A)

RETARDING CONTROL APPARATUS WHICH OPERATES ON THE BASIS OF SIGNALS SUCH AS A SHIFT LEVER POSITION SIGNAL

This application is a continuation of application Ser. No. 07/660,558, filed Feb. 25, 1991, now abandoned.

BACKGROUND OF THE INVENTION

1. Field of the Invention

This invention relates to a retarding control apparatus operated by a manual changeover. More particularly, the invention relates to a retarding control in which braking force due to a retarder is controlled depending upon the state of a manual shift or the steering angle of a wheel and slipping state.

2. Related Art

Relating to a first aspect of the present invention, a heavy vehicle often is equipped with an auxiliary brake such as an exhaust brake or hydraulic retarder in addition to a foot brake as braking means.

FIG. 1 illustrates an example of a conventional retarding control apparatus equipped with a hydraulic retarder. When a manually operated changeover switch 1 is turned on, an ECU 2 to which a changeover signal from the changeover switch 1 is applied outputs a current to a solenoid 3 to actuate a control valve 4 and introduce hydraulic pressure to a hydraulic retarder 5, whereby a braking force resulting from the retarder 5 is generated.

First Problem to be Solved by the Invention

In this conventional retarding control apparatus described above, braking force produced by the retarder 5 is regulated by operating the changeover switch 1. Consequently, in a case where the retarding control apparatus is combined with an automatic transmission, a braking force resulting from engine braking accompanying a manual downshift is added to the braking force produced by the retarder 5 if the manual downshift is performed by operation of a shift lever when the changeover switch 1 is on and the retarder 5 is operating. As a result, the braking force is excessive and, as indicated by the dashed line in FIG. 7(e), transmission shock at shifting is enlarged by a sudden change in vehicle speed and deceleration, and driving comfort suffers as a consequence.

Relating to a second aspect of the present invention, FIG. 2 illustrates an example of another retarding control apparatus of a hydraulic retarder 12 mounted on a largesize vehicle 11. When a retarder switch 13 provided at the driver's seat of the vehicle 11 is turned on, a control valve 15 is actuated by stepping down on a brake pedal 14, and hydraulic pressure acting upon a controller valve 16, which delivers hydraulic pressure to the retarder 12, is regulated as a result, thereby effecting control of the braking force by the retarder 12.

Second Problem to be Solved by the Invention

The relationship between coefficient of friction $\mu$, which is produced between the tire and the road surface, and slip rate S is as shown in FIG. 3. The effective range of the slip rate S for stable travel is the interval x in FIG. 3. When the interval x is exceeded, the coefficient of friction $\mu$ suddenly declines and the tire skids. Consequently, even if the vehicle is equipped with ABS (an antiskid braking system), the braking force of the retarder 12 becomes excessive and there is the danger that the wheels will lock. The upper limit of the retarder braking force F for which the wheels will not lock in an instance where the effective range of the slipping rate is exceeded is as indicated by the broken lines y in FIG. 4. The retarder braking force characteristic in FIG. 4 illustrates a case in which the lower the characteristic curve in FIG. 4, the greater the amount the brake pedal 14 is depressed.

In the conventional retarding control apparatus of the kind described above, the braking force of the retarder 12 is controlled by regulating the amount by which the brake pedal 14 is depressed. Consequently, when the slip rate S increases at the time of cornering or at braking on a slippery road surface, there is the danger that the wheels will lock due to excessive braking. This is extremely dangerous.

In particular, in the case of a heavy, large-size vehicle having a long wheel base, the slip rate of the tires is increased by the inner-wheel difference between the front and rear wheels at cornering, and hence the influence of excessive braking becomes especially large and the vehicle body assumes an unstable state due to locking of the wheels. This can be very hazardous. The same situation can arise even in a vehicle equipped with an ABS.

SUMMARY OF THE INVENTION

A general object of the present invention is to provide a retarding control apparatus which solves the aforementioned problems encountered in the conventional retarding control apparatus.

More specifically, a first object of the present invention is to provide a retarding control apparatus in which optimum braking force commensurate with the traveling state of the vehicle can be obtained even if a retarder operated by a manual changeover switch is used in combination with an automatic transmission.

A second object of the present invention is to provide a retarding control apparatus in which there is no risk of excessive application of retarder braking force when the vehicle is braked at cornering.

In order to attain the first object in the first aspect of the present invention, there is provided a retarding control apparatus for controlling operation of a retarder, which is connected to an automatic transmission, by operating a retarder actuating device by manipulation of a retarder changeover switch, characterized by comprising sensing means for sensing the shift position of a shift lever, throttle opening detecting means, and control means, to which are inputted a shift position signal from the shift position sensing means, a throttle opening signal from the throttle opening detecting means, and a changeover signal from the retarder changeover switch, for outputting an operating signal to the retarder actuating device, wherein when the control means receives the changeover signal as an input from the retarder changeover switch for actuating the retarder and decides that a manual downshift has taken place based upon the shift position signal and throttle opening signal, the control means diminishes the operating signal to the retarder actuating device in such a manner that braking force produced by the retarder is reduced by a prescribed value.

The retarding control apparatus according to the first aspect is such that when the retarder changeover signal for operating the retarder is inputted to the control means in response to turn-on of the retarder changeover switch, the operating signal is outputted to the retarder actuating device so that a prescribed optimum braking force produced by the retarder is generated.

When the retarder changeover switch is thus turned on and braking by the retarder is taking place, the output of the operating signal to the retarder actuating device is reduced by a prescribed value if the shift lever is operated and the control means decides that a manual downshift has occurred based upon input of the shift position signal from the shift position sensing means and the throttle opening signal from the throttle opening detecting means. Accordingly, at the time of a manual downshift, the braking force of the retarder is decreased by an amount commensurate with the reduction in the operating signal.

In a retarding control apparatus which is a variant of the first aspect, the above-described arrangement is supplemented by an arrangement wherein the value of the decrease in the braking force of the retarder at the time of manual downshift by the control means is set in correspondence with the shift position that prevails after the manual downshift. As a result, the reduction in the braking force of the retarder at manual downshift is set for every shift position after manual downshift so that control of the retarder braking force can be performed in conformity with each manual downshift.

In accordance with a further modified variant of the first aspect, the retarding control apparatus has vehicle speed detecting means, wherein the control means, based upon a vehicle speed signal from the vehicle speed detecting means, sets a time for diminishing the operating signal to the retarder actuating device. This makes it possible to perform control of the retarder braking force commensurate with the prevailing vehicle speed.

In accordance with the first aspect described above, the braking force of the retarder connected to the automatic transmission decreases when a manual downshift is performed. As a result, the braking force acting upon the vehicle owing to the braking force of engine braking that accompanies a manual downshift is no longer in danger of becoming excessive. Consequently, transmission shock is mitigated and the feel of the ride can be improved.

In order to attain the second object in the second aspect of the present invention, there is provided a retarding control apparatus for controlling operation of a retarder, which is connected to an automatic transmission, by operating a retarder actuating device by manipulation of a retarder changeover switch:

comprising vehicle speed detecting means for detecting vehicle speed, driving-wheel velocity detecting means for detecting velocity of a driving wheel, steering angle detecting means for detecting steering angle of a wheel, brake actuation detecting means for detecting actuation of a brake, and control means to which are inputted a vehicle speed signal, a driving-wheel velocity signal, a steering angle signal and a brake actuation signal from these detecting means and an ON signal from the retarder switch, for outputting a retarder operating signal to the retarding actuating device, the control means having a map in which are set control characteristics such that when the slip rate of the wheel is not more than a fixed value, retarder braking force is increasingly reduced the larger the slip rate becomes; when the slip rate exceeds the fixed value and lies in a predetermined range, the retarder braking force is held at a constant value; and when the slip rate exceeds the predetermined range, the retarder braking force is increasingly reduced the larger the slip rate becomes and is made relatively smaller the larger the steering angle of the wheel becomes, wherein when the brake actuation signal and the ON signal from the retarder switch are being inputted to the control means, the control means selects from the map, on the basis of the steering angle signal, a control characteristic of retarder braking force corresponding to steering angle, computes slip rate based upon the vehicle speed signal and driving-wheel velocity signal, and outputs the retarder operating signal to the retarder actuating device based upon the computed slip rate and the selected control characteristic of the retarder braking force.

The retarding control apparatus according to the second aspect is such that if the retarder switch is turned on when braking is being performed, the control means selects, in accordance with the currently prevailing steering angle of the wheel, the control characteristic of the retarder braking force set in the map, and executes retarding control in line with the set control characteristic in such a manner that the retarder braking force becomes relatively smaller the larger the steering angle becomes.

When the currently prevailing slip rate, which has been computed in accordance with the vehicle speed signal and driving-wheel velocity signal, is in a predetermined range, namely when the coefficient of friction between a tire and the road surface lies within an effective range of coefficients of friction maintained above a predetermined value, the control means outputs a retarder operating signal to the retarder actuating device so that the retarder braking force will be maintained at a fixed value.

When the slip rate exceeds the predetermined range (the effective range of coefficients of friction), the control means outputs a retarder operating signal to the retarder actuating device so that the retarder braking force is reduced, with the result being that the slip rate is held in the predetermined range (the effective range of coefficients of friction).

If the brake actuation signal is adopted as an ABS operating signal, the above-described retarding control apparatus can be installed to function in a vehicle equipped with an ABS (antiskid brake system). Even if a vehicle is one not equipped with an ABS, the retarding control apparatus can be installed if the brake actuation signal is adopted as the ON signal of the brake switch attached to the brake pedal.

Thus, in accordance with the second aspect of the invention, the retarder braking force is automatically controlled based upon the slip rate and steering angle of the wheel. Control is carried out in such a manner that the retarder braking force becomes smaller the larger the steering angle. When the slip rate becomes greater than a predetermined value, control is performed in such a manner that the retarder braking force is reduced so that the slip rate will not exceed the predetermined value. As a result, safe cornering of the vehicle becomes possible. This aspect of the invention is particularly effective for a large-size vehicle.

In addition, the retarding control apparatus of this aspect of the invention can be installed in both a vehicle equipped with an ABS and a vehicle not having an ABS.

Other features and advantages of the present invention will be apparent from the following description taken in conjunction with the accompanying drawings,

BRIEF DESCRIPTION OF THE DRAWINGS

FIG. 1 is a block diagram illustrating a retarding apparatus according to the prior art;

FIG. 2 is a block diagram illustrating a retarding apparatus according to another example of the prior art;

DESCRIPTION OF THE PREFERRED EMBODIMENTS

A first aspect of the present invention will now be described in detail based upon an embodiment illustrated in FIGS. 5 through 7.

Figure 5:
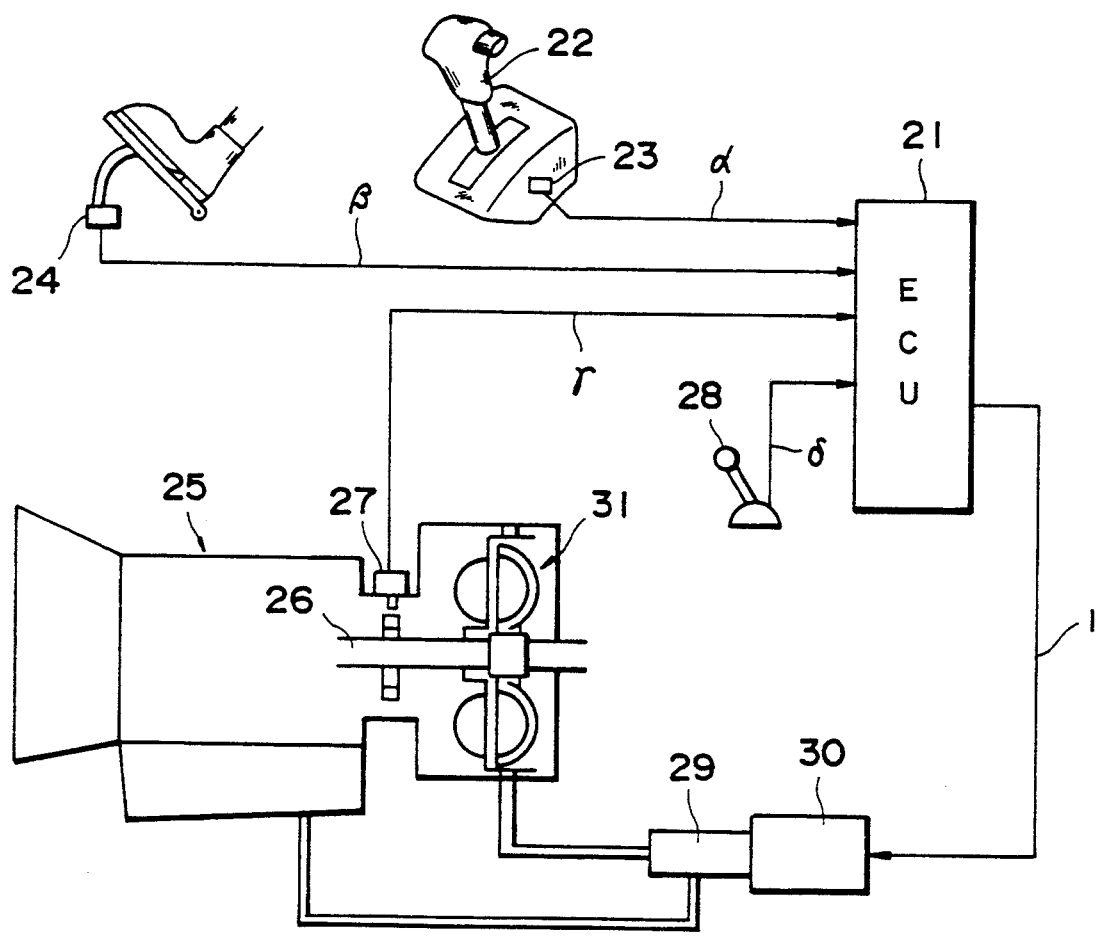
FIG. 5 is a block diagram showing an embodiment of a first aspect of the present invention.

As shown in FIG. 5, an electronic control unit ECU 21 comprising a computer unit receives, as inputs thereto, a shift position signal $\alpha$ from a shift position sensor (shift position sensing means) 23 attached to a shift lever 22, a throttle opening signal $\beta$ from a throttle opening sensor (throttle opening detecting means) 24 attached to an accelerator pedal, a vehicle speed signal $\gamma$ from a vehicle speed sensor (vehicle speed detecting means) 27 attached to an output shaft 26 of an automatic transmission 25, and a retarder changeover signal $\delta$ from a retarder changeover switch 28. The ECU 21 outputs a retarder solenoid signal (current) I to a solenoid 30 connected to a control valve 29 for retarder control, therby controlling the operation of the control valve 29 to regulate hydraulic pressure supplied to a hydraulic retarder 31 attached to the output shaft 26 of the automatic transmission 25.

The ECU 21 is so designed that a manual downshift is decided when the following two conditions are satisfied:

i) the throttle opening is zero, and ii) the shift position of the shift lever 22 undergoes any of the changes D→3, D→2, D→L, 3→2, 3→L, 2→L.

When the retarder changeover switch 28 is turned on so that the retarder changeover signal $\delta$ enters the ECU 21, the current I is delivered to the solenoid 30 and hydraulic pressure is introduced to the retarder 31 by operation of the control valve 29. As a result, a constant braking force $F_1$ produced by the retarder 31 acts upon the output shaft 26.

Figure 6:
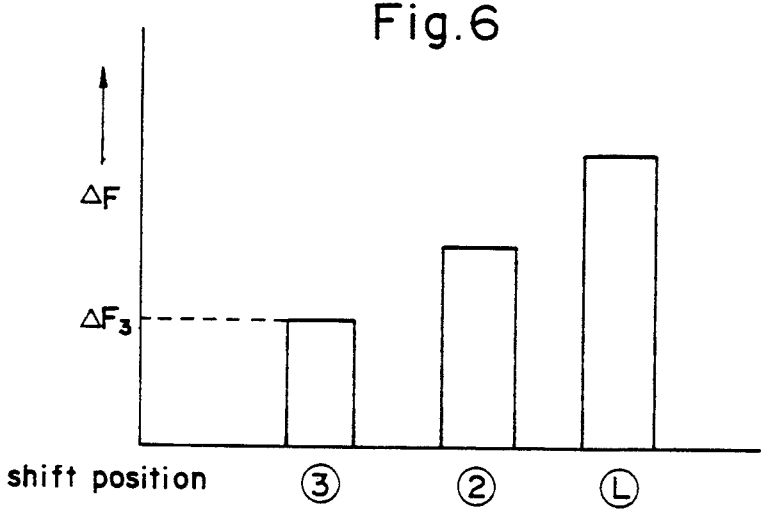
FIG. 6 is a graph showing amounts of braking force decrease in this embodiment.

If, when the retarder changeover switch 28 has been turned on so that braking is being performed by the retarder 31, as described above, the shift lever 22 is operated and the ECU 21 determines that a manual downshift has taken place based upon the shift position signal $\alpha$ from the shift position sensor 23 and the throttle opening signal $\beta$ from the throttle opening sensor 24, then the ECU 21 reduces the braking force of the retarder 31 by a braking force $\Delta F$ set for every position of the downshifted shift lever 22, as illustrated in FIG. 6. As a result, the output of current I to the solenoid is diminished by a current $\Delta I$ commensurate with the braking force decrease $\Delta F$. It should be noted that the braking force decrease $\Delta F$ is set so as to be larger the closer the shift position is to the low-speed side, as will be understood from FIG. 6.

Figure 7:
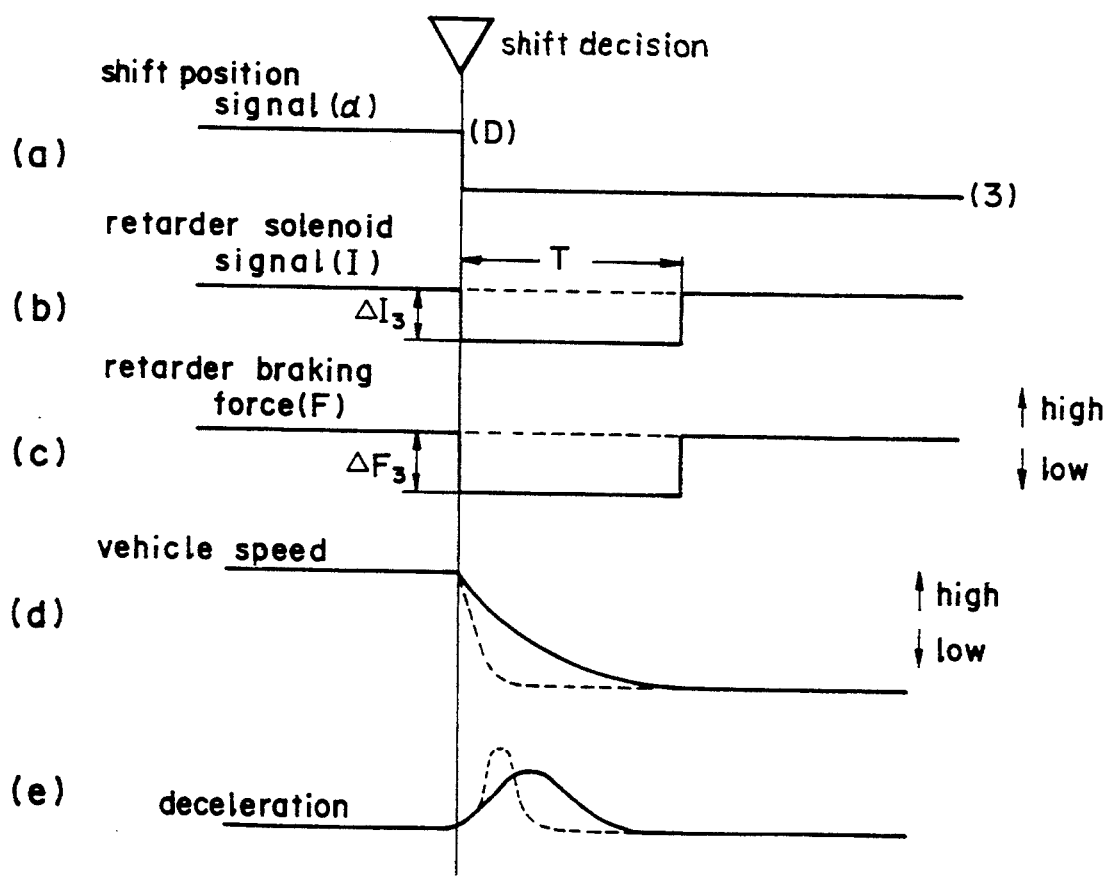
FIG. 7 is an explanatory view for describing control of retarder braking force in this embodiment.

By way of example, if the shift position signal $\alpha$ indicates a D→3 shift [(a) in FIG. 7] in a state where the retarder changeover switch 28 is on and the throttle opening is zero, then the current I to the solenoid 30 is reduced by a current $\Delta I_3$ [(b) in FIG. 7] corresponding to a braking force decrease $\Delta F_3$ (see FIG. 6) [(c) in FIG. 7] commensurate with the "3rd" position of the shift lever 22.

Accordingly, the braking force F which acts upon the vehicle at this time is expressed by the following equation:

$$F = F_1 + F_2 + F_3 - \Delta F_3$$

where $F_2$ represents a braking force produced by a foot brake and $F_3$ represents a braking force produced by engine braking which accompanies a manual downshift.

A time T for reducing the current $\Delta I$ is set in proportion to the currently prevailing vehicle speed. More specifically, based upon the vehicle speed signal $\delta$ from the vehicle speed sensor 27, the ECU 21 computes the time T in accordance with the equation $$T = a \cdot N$$

where a represents a constant and N the rotational speed (=vehicle speed) of the output shaft, reduces the current I to the solenoid 30 by $\Delta I$ for the period of time T, and halts the decrease in current I when the time period T elapses.

With the retarding control apparatus described above, the rates of change in vehicle speed and deceleration, as indicated by the solid lines at (d) and (e) in FIG. 7, are gentler than in the prior art indicated by the dashed lines. As a result, transmission shock is significantly reduced.

A second aspect of the present invention will now be described in detail based upon an embodiment shown in FIGS. 8 through 10.

Figure 8:
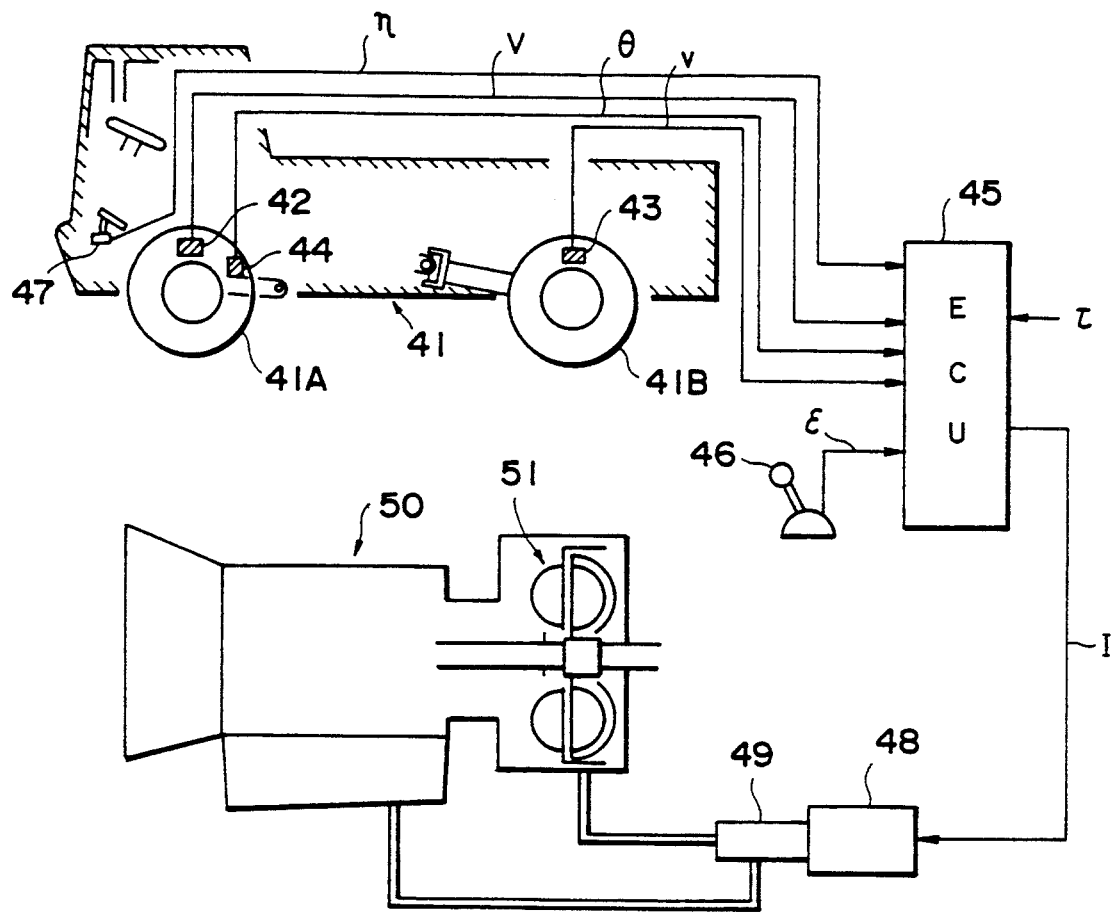
FIG. 8 is a diagram showing the construction of an embodiment according to a second aspect of the present invention.

As shown in FIG. 8, a vehicle speed sensor 42 is attached to a driven wheel (front wheel) of a vehicle 41A, and a wheel speed sensor 43 is attached to a driving wheel (rear wheel) 41B of the vehicle. A steering angle sensor 44 is attached to a steering portion of the driven wheel 41A. Vehicle speed V detected by the vehicle speed sensor 42 and wheel speed v detected by the wheel speed sensor 43 enter an ECU 45. Also inputted to the ECU 45 are a steering angle signal $\theta$ from the steering angle sensor 44 and an ON signal $\epsilon$ from a retarder switch 46.

If the vehicle is equipped with an ABS, it is so arranged that an ABS operating signal $\tau$ enters the ECU 45. If the vehicle is not equipped with an ABS, the arrangement is such that an operating signal $\eta$ from a brake switch 47, which is attached to the brake pedal, is inputted to the ECU 45.

On the basis of these signals, the ECU 45 outputs a control signal (current) I to a retarder solenoid 48 to actuate a control valve 49, thereby controlling a hydraulic retarder 51 mounted on the output shaft of a transmission 50.

Figure 9:
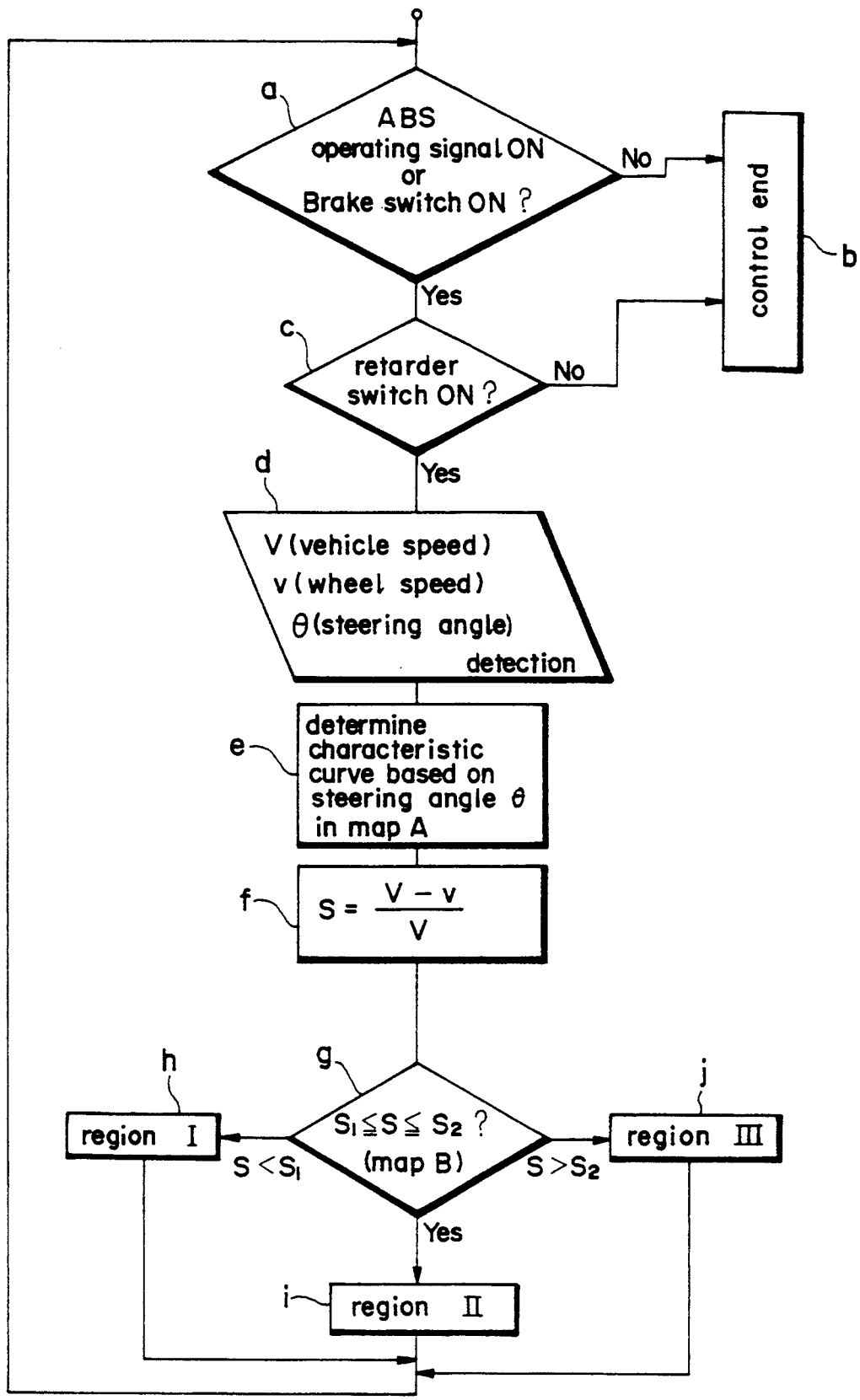
FIG. 9 is a flowchart for describing retarding control in this embodiment.

Control of the retarder 51 performed by the retarding control apparatus described above will now be set forth while referring to the flowchart of FIG. 9.

As shown in FIG. 9, the ECU 45 determines at step (a) whether an ABS is on and its operating signal $\tau$ has entered if the vehicle is equipped with an ABS, or whether the brake switch 47 is on and its operating signal $\eta$ has entered (namely whether the brake pedal has been depressed) if the vehicle is not equipped with an ABS. If the ABS or brake switch 47 is not on, then control is ended at step (b). If the ABS or brake switch 47 is on, then it is determined at the next step (c) whether the retarder switch 46 is on.

If the retarder switch 46 is not on, control is ended at step (c); if it is on, then the vehicle speed V, the speed v of the driving wheel 41B and the steering angle $\theta$ are detected at step (d) based upon the detection signals from the vehicle speed sensor 42, wheel speed sensor 43 and steering angle sensor 44.

Figure 10:
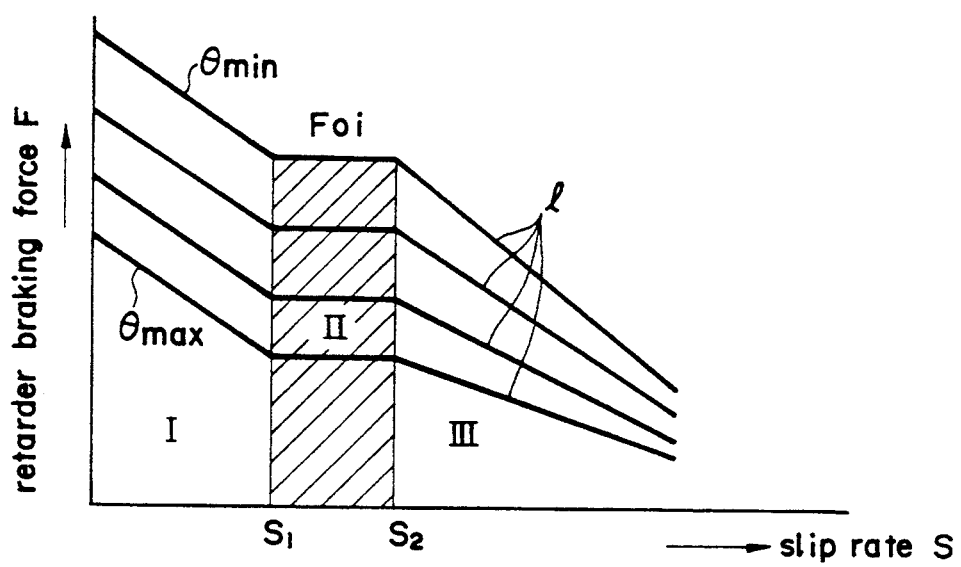
FIG. 10 is a map illustrating the characteristics of retarder braking force in this embodiment.

On the basis of the detected value of the steering angle $\theta$, the ECU 45 decides at step (e) which characteristic line 1 corresponding to the steering angle $\theta$ to use in the map A of FIG. 10, which illustrates the relationship between retarder braking force F and slip rate S. The characteristic lines 1 indicate successively larger steering angles from top to bottom. In addition, regions I, II, III correspond to regions I, II, III of map B (FIG. 3) illustrating the relationship between the tire the coefficient of friction $\mu$ which is produced between the tire and the road surface, and the slip rate S.

Figure 3:
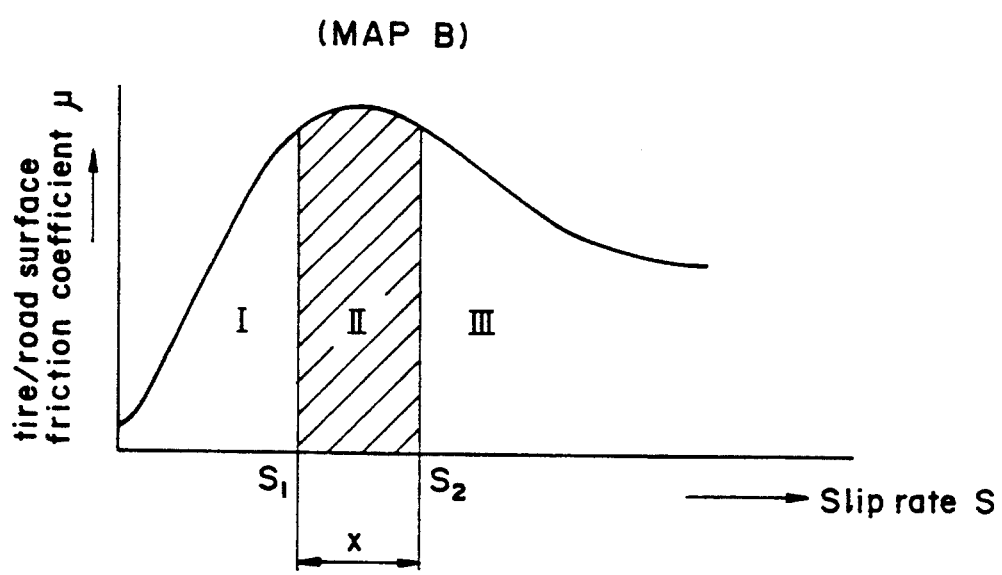
FIG. 3 is a diagram showing the relationship between coefficient of friction and slip rate.
Figure 4:
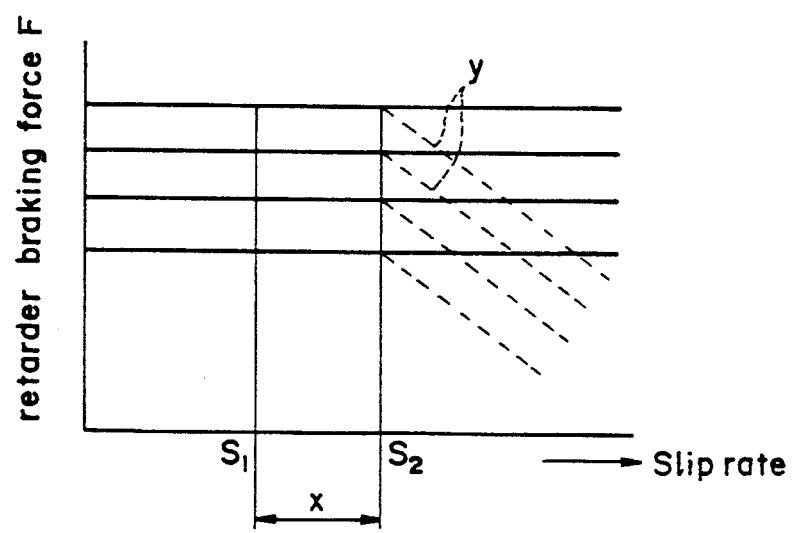
FIG. 4 is a diagram showing characteristics of retarder braking force according to the prior art.

Further, on the basis of the detected values of vehicle speed V and wheel speed v, the ECU 45 computes the slip rate S of the tires at step (f) in accordance with the equation $S=V-v/V$, compares the computed value of the slip rate S with the map B of FIG. 3 and determines at step (g) in which region of the map B the current slip rate S resides. Here the region II between $S_1$ and $S_2$ indicates the effective range of the slip rate S of map B.

When the current slip rate S is found to be in the range of region I of map B at the decision step (g) regarding slip rate S; the retarder braking force F is controlled at step (h) in accordance with the portion of the characteristic line 1 of map A, which has been selected by the decision step (e), that is inside region I. When the current slip rate S is found to be in the range of region II of map B, the retarder braking force F is controlled at step (i) in accordance with the portion of the characteristic line of map A that is inside region II. When the current slip rate S is found to be in the range of region III of map B, the retarder braking force F is controlled at step (j) in accordance with the portion of the characteristic line of map A that is inside region III.

More specifically, in region I of map A, the current value of the control signal I from the ECU 45 to the retarder solenoid 48 is reduced with an increase in the slip rate S to $S_1$, thereby diminishing the retarder braking force F. In region II, the current value I of the control signal from ECU 45 to the retarder solenoid 48 is held constant when the slip rate S is between $S_1$ and $S_2$, thereby holding the retarder braking force F at a constant value $F_{oi}$.

In the area III of map III, the current value of the control signal I from ECU 45 to the retarder solenoid 48 is reduced with an increase in the slip rate from $S_2$. Since the slip rate S declines owing to a decrease in the retarder braking force F, the slip rate S returns to region II. In actuality, the slip rate S hardly ever exceeds the maximum value $S_2$ of region II and does not significantly enter the portions of the characteristic lines 1 of map A that are inside region III.

Thus, the retarder braking force F is controlled based upon the slip rate S of a tire, and an optimum control characteristic is selected by the steering angle $\theta$ of a wheel. As a result, the tire slip rate S is constantly maintained in the effective region x of the region map B.

As many apparently widely different embodiments of the present invention can be made without departing from the spirit and scope thereof, it is to be understood that the invention is not limited to the specific embodiments thereof except as defined in the appended claims.

What is claimed is:

1. A retarding control apparatus for controlling operation of a retarder, which is connected to an automatic transmission, by operating a retarder actuating device through manipulation of a retarder changeover switch, comprising:
   shift position sensing means for sensing a shift position of a shift lever;
   throttle opening detecting means for detecting a throttle opening; and
   control means, to which are inputted a shift position signal from said shift position sensing means, a throttle opening signal from said throttle opening detecting means, and a changeover signal from said retarder changeover switch, for outputting an operating signal to the retarder actuating device;
   wherein when said control means receives the changeover signal as an input from the retarder changeover switch for operating the retarder and decides that a manual downshift has taken place based upon the shift position signal and throttle opening signal, said control means diminishes the operating signal to the retarder actuating device in such a manner that the retarder produces a braking force that is reduced by a prescribed value.

2. The control apparatus according to claim 1, wherein the prescribed value by which the braking force of the retarder is reduced by the control apparatus at the time of the manual downshift is set in correspondence with the shift position which prevails after the manual downshift.

3. The control apparatus according to claim 1, further comprising speed detecting means, wherein said control means, based upon a speed signal from said speed detecting means, sets a time for diminishing the operating signal to the retarder actuating device.

* * * * *